United States Patent Office 3,547,943
Patented Dec. 15, 1970

3,547,943
N-METHYLOLSILYLETHERS OF UREAS AND IMIDAZOLIDINONES
Ferdinand Senge, Krefeld, and Hermann Schnell, Krefeld-Urdingen, Germany, assignors to Farbenfabriken Bayer Aktiengesellschaft, Leverkusen, Germany, a corporation of Germany
No Drawing. Original application July 11, 1967, Ser. No. 652,413. Divided and this application June 30, 1969, Ser. No. 837,921
Claims priority, application Germany, July 26, 1966, F 49,786
Int. Cl. C07d 103/04, 49/34
U.S. Cl. 260—309.7      10 Claims

ABSTRACT OF THE DISCLOSURE

N-methylolsilylethers formed by reacting N-methylol compounds with hexaalkyldisilazanes in a molar ratio of about 1:1 to 1:8 at temperatures of 20–130° C. and their utility in modifying polymeric products.

---

This application is a division of application Ser. No. 652,413 as filed July 11, 1967.

This invention relates to N-methylolsilylethers and to a process for their preparation.

N-methylolsilylethers have not hitherto been known. A process for the preparation of N-methylolsilylethers has now been found which comprises reacting N-methylol compounds with hexaalkyldisilazanes in a molar ratio of about 1:1 to 1:8 at temperatures of 20–130° C.

The reaction may be explained by the following equation:

$$2-N-CH_2-OH + alkyl-\underset{\underset{alkyl}{|}}{\overset{\overset{alkyl}{|}}{Si}}-N-\underset{\underset{alkyl}{|}}{\overset{\overset{alkyl}{|}}{Si}}-alkyl \longrightarrow$$
$$\phantom{xxxxxxxxxxxxxxxx} R_1$$

$$2-N-CH_2-O-\underset{\underset{alkyl}{|}}{\overset{\overset{alkyl}{|}}{Si}}-alkyl + 2R_1-NH_2$$

$R_1$=H, alkyl or aryl

It is surprising that the process according to the invention proceeds in such a simple manner and with good yields.

The N-methylol compounds (I) used as starting materials are known from the literature and can be obtained by reacting suitable nitrogen-containing compounds with formaldehyde in an aqueous medium or with polymeric formaldehyde in an anhydrous medium.

The following compounds may be mentioned as examples of suitable N-methylol compounds for the process of the invention: N-methylol compounds of aliphatic, aromatic, cycloaliphatic, araliphatic, heterocyclic carboxylic or sulphonic acid amides or carboxylic acid imides. The carboxylic acid or sulphonic acid amides may be substituted on the amide group by alkyl groups having 1 to 8 C-atoms such as methyl-ethyl or isopropyl or by aryl groups such as phenyl or naphthyl, and these may in addition contain lower alkyl or halogen substituents. Similarly, the acid radicals on which the carboxylic acid or sulphonic acid amides are based may be substituted by radicals such as halogen, in particular chlorine, or by nitro groups, alkoxy groups or alkoxy carbonyl groups, etc. The above-mentioned aliphatic or araliphatic acid amides or imides may be linear or branched; they may also contain olefinically unsaturated bonds once or a number of times in the molecule. The carboxylic acid and sulphonic acid amides and carboxylic acid imides are derived from the corresponding mono- or polybasic acids.

The following are examples of typical N-methylol compounds. N-methylol-acetamide, N-methylol-propionic acid amide, N-methylol-N-methylpropionic acid amide, N-methylol-undecanoic acid amide, N-methylol-stearic acid amide, N-methylol-palmitic acid amide, N-methylol-α-chloroacetamide, N-methylol-acrylic acid amide, N-methylol-N-phenyl acrylic acid amide, N-methylol-methacrylic acid amide, N-methylol-α-ethyl acrylic acid amide, N-methylol-α-chloroacrylic acid amide, N-methylol-oleic acid amide, N-methylol-sorbic acid amide, N,N'-bis-methylol-fumaric acid diamide, N,N'-bis-methylol-muconic acid diamide, N,N'-bis-methylol-adipic acid diamide and N,N'-bis-methylol-sebacic acid diamide; N-methylol-cyclohexanecarboxylic acid amide, N-methylol-cyclopentane-carboxylic acid amide; N-methylol-benzoic acid amide; N-methylol-p-tolyl acid amide, N-methylol-naphthoic acid amide, N-mehtylol-salicylic acid amide, N-methylol-4-hydroxybenzoic acid amide, N-methylol-4-tertiary butyl benzoic acid amide, N-methylol-4-chlorobenzoic acid amide, N-methylol-phenylacetic acid amide and N-methylol-4-pyridino-carboxylic acid amide; N-methylol-methanesulphonic acid amide, N-methylol-butane-sulphonic acid amide, N-methylol-dodecylsulphonic acid amide, N-methylol-benzene sulphonic acid amide, N-methylol-N-methyltoluenesulphonic acid amide, and N-methylol-cyclohexanesulphonic acid amide; N-methylol-malonic acid imide, N-methylol-maleic acid imide, N-methylol-phthalimide, N-methylol-tetrahydrophthalimide, N-methylol-hexahydrophthalimide and N-methylol-diglycollic acid imide.

Other suitable N-methylol compounds are saturated or unsaturated urethanes or ureas or N-monomethylol to N-hexamethylol compounds of melamine. The said classes of compounds may be partly substituted on the nitrogen by alkyl groups having 1 to 4 C-atoms or alkenyl groups having 2 to 6 C-atoms or by the butadiene-(1,3)-yl group.

The following compounds may be mentioned as particular examples: N-methylol-carbamic acid esters having 1 to 18 C-atoms in the ester alkyl group, N-methylol-carbamic acid allyl esters (allylurethane), N-monomethylol-urea, N,N'-bis-methylol-urea, N-monomethyl-N-monomethylol-urea, N,N'-dimethyl - N - monomethylol-urea, N,N'-dimethylol - N,N' - dimethyl-urea, N-monomethylol-ethylene-urea, N,N'-bis-methylol-ethylene-urea, N-vinyl-N'-methylol-urea, and N-methylol compounds of dicyandiamide.

The following compounds are preferred: N-methylol-acetamide, N-methylol-acrylic acid amide, N-methylol-methacrylic acid amide, N-methylol-p-toluenesulphonic acid amide, N-methylolsorbic acid amide, N-methylol-maleic acid amide, N-methylol-phthalic acid imide, N-methylol-carbamic acid allyl esters, N-monomethylolurea, N,N'-bis-methylol-urea and the mono- to hexamethylol compounds of melamine.

The hexaalkyl-disilazane to be used according to the invention which have the general formula $$(R)_3\equiv Si-\underset{\underset{R_1}{|}}{N}-Si\equiv(R)_3$$

in which

R=alkyl, preferably methyl,
$R_1$=H or alkyl having 1 to 18 C-atoms, aryl such as phenyl, which may be substituted by halogen, in particular chlorine or by alkyl groups having 1 to 4 C-atoms, are obtained in known manner (see W. Noll "Chemie und Technologie der Silikone," Verlag Chemie GmbH., Weinheim, Bergstr. 1960, p. 75; Gmelins Handbuch der Anorg. Chemie, Verlag Chemie GmbH., 1958, 8th edition, volume 15, part C, p. 307) by reacting trialkylmonochlorosilanes with ammonia or primary aliphatic or primary aromatic amines.

It is preferred to use hexamethyldisilazane, N-methyl-hexamethyldisilazane and N-ethyl hexamethyldisilazane. Hexamethyldisilazane is the most preferred compound.

The N-methylol compounds are reacted with the disilazanes in the molar ratio of about 1:1 to 1:8, preferably 1:1.1 to 1:2 at temperatures of 20 to 130° C., preferably 40 to 80° C. It is advantageous to carry out the reaction in the presence of catalytic quantities of a catalyst which has an acid action. The quantities of catalyst are from 0.001 to 2% by weight based on disilazane, preferably 0.01 to 0.5% by weight.

The following compounds are examples of suitable acid catalysts: HCl, $H_2SO_4$, $H_3PO_4$, butanesulphonic acid, p-toluenesulphonic acid and, preferably, the corresponding ammonium salts.

With very highly reactive N-methylol compounds, the reaction can also be carried out without catalysts although the reaction then generally proceeds considerably more slowly and only at higher temperatures. This may lead to deleterious side reactions such as autocondensation of the methylol compounds. In the case of compounds that are less sensitive to condensation, one can also successfully use catalytic quantities of the free acid.

The process according to the invention can be carried out in bulk or in an organic solvent. Suitable solvents include, for example, dimethylsulphoxide, methyl acetate, ethyl acetate, dioxane and tetrahydrofuran. For preference, ethyl acetate or methyl acetate is used.

The process itself may be carried out by mixing the methylol compound with the hexaalkyldisilazane and, where used, the acid catalyst and/or a solvent and heating the mixture to the reaction temperature, when liberation of ammonia or of the amine from which the hexaalkyl-disilazane is derived takes place. After the reaction is complete, the product is worked up by distillation or crystallisation. Alternatively, the reaction may be carried out by adding the methylol compound to the other reactants either continuously or discontinuously.

A preferred method of preparing the N-methylolsilyl ethers according to the invention consists in reacting the N-methylol compounds with hexamethyldisilazane in a molar ratio of 1:1.1–2 in the presence of catalytic quantities of $(NH_4)_2SO_4$ at 40 to 80° C. with the exclusion of moisture and with stirring. After only a short time the reaction becomes evident by vigorous evolution of ammonia. When the evolution of gas has died down, stirring is continued for another 10 to 15 minutes and the excess hexamethyldisilazane is drawn off. For many purposes, the N-methylolsilyl ether obtained in this way is sufficiently pure.

Other disilazanes and different proportions of reactant catalysts or organic solvents may be used and different temperatures may be employed.

If it is desired to prepare the methylolsilyl ethers by reacting alkyl monochlorosilanes with N-methylol compounds, the presence of stoichiometric quantities of HCl acceptors such as pyridine or other tertiary amines is necessary. The hydrochloride produced in large quantities in this reaction, however, renders working up difficult and easily cause undesired side reactions.

These disadvantages can be obviated by the process according to the invention.

N-methylolsilyl ethers prepared according to the invention are valuable intermediate products for medicaments, textile auxiliary agents and synthetic resins.

The N-methylolsilyl ethers are capable of reacting with other reactive groups, e.g., hydroxyl groups, carboxyl groups, amino groups, even under mild conditions. Therefore, the N-methylolsilyl ethers are useful for modifying polymers and polycondensation products containing the abovesaid groups, e.g., for hydrophobing cellulose and partial cellulose esters as well as for crease-proofing cotton.

Bi- or polyfunctional N-methylolsilyl ethers as well as the disilyl ether of N,N'-dimethylol adipic acid diamide react with hydroxyl group-containing macromolecules with cross-linking. Therefore, they can be used as cross-linking agents in lacquer binders having incorporated hydroxyl groups.

EXAMPLE 1

10 g. (0.112 mol) of N-methylolacetamide, 9 g. (0.056 mol) of hexamethyldisilazane and 0.01 g. of sulphuric acid are heated to 70 to 75° C. with stirring and exclusion of moisture. After a short time, brisk liberation of ammonia begins and this is complete after about 10 minutes. The solution is diluted with about 50 ml. of petroleum ether, filtered, and the solvent is drawn off. The residue is fractionated using an oil pump.

Yield: 13 g. (0.086 mol)=71.8% by weight of the theoretical.

$B.P._{0.1\ mm}$: 60–61° C. $d_4^{20}$=0.962. $n_D^{20}$=1.4361.

$C_6H_{15}O_2NSi$ (161.248).—Calculated (percent): C, 44.69; H, 9.38; N, 8.69; Si, 17.42. Found (percent): C, 44.42; H, 9.17; N, 9.02; Si, 17.10.

EXAMPLE 2

In a manner analogous to Example 1, 9 g. (0.044 mol) of N,N'-dimethylol-adipic acid diamide are reacted with 17.1 g. (0.1 mol) of hexamethyldisilazane. About 35 ml. of benzene are added to the resulting solution, the solution is filtered and the solvent is drawn off. The residue is recrystallised from methyl acetate.

Yield: 10 g. (0.0287 mol)=65.4% by weight of theoretical.

Melting point: 75–75.5° C.

$C_{14}H_{32}O_4N_2Si_2$ (348.606).—Calculated (percent): C, 48.24; H, 9.25; N, 8.04; Si, 16.12. Found (percent): C, 48.52; H, 8.93; N, 8.24; Si, 16.15.

EXAMPLE 3

29.5 g. (0.2 mol) of N,N'-dimethylolurea, 40 g. (10.25 mol) of hexamethyldisilazane, 29 g. of dimethylsulphoxide and 0.1 g. of $(NH_4)_2SO_4$ are heated to 55 to 60° C. with stirring and exclusion of moisture. After a short time, brisk evolution of ammonia begins and this is complete after about 10 minutes. The solution is diluted with about 50 ml. of petroleum ether, filtered, and cooled with ice. The precipitated product is separated by suction filtration, dried, and recrystallised from ligroin.

Yield: 44 g. (0.1505 mol)=75% by weight of theoretical. Melting point: 158° C. (with decomposition).

EXAMPLE 4

In a manner analogous to Example 1, 24 g. (0.202 mol) of N-methylol-carbamic acid ethyl ester and 18.5 g. (0.115 mol) of hexamethylidsilazane are reacted at 55 to 50° C. in the presence of 0.01 g. of sulphuric acid (conc.). When the reaction is complete, the product is removed by suction filtration and fractionated using an oil pump.

Yield: 20 g. (0.091 mol)=45.5% by weight of theoretical.

$B.P._{0.1\ mm}$ 50–52° C. $d_4^{20}$=0.9890; $n_D^{20}$=1.4286:

$C_7H_{17}O_3NSi$ (molecular weight, 191.311).—Calculated (percent): C, 43.95; H, 8.95; N, 7.32; Si, 14.68. Found (percent): C, 44.16; H, 8.71; N, 7.16; Si, 14.27.

EXAMPLE 5

In a manner analogous to Example 1, 6.5 g. (0.05 mol) of N-methylol-sorbic acid amide and 5 g. (0.031 mol) of hexamethyldisilazane are reacted together in the presence of 0.01 g. of sulphuric acid (conc.). When the reaction is complete, 20 ml. of petroleum ether are added, the reaction mixture is filtered, the filtrate is cooled and the precipitated product is separated by suction filtration and dried.

Yield: 5 g. (0.0228 mol)=47.5% by weight of the theoretical.

Melting point: 79–80° C.

$C_{10}H_{19}NO_2Si$ (213.36).—Calculated (percent): C, 56.29; Si, 13.16. Found (percent): C, 56.29; Si, 13.00.

EXAMPLE 6

In a manner analogous to Example 1, 5 g. (0.0226 mol) of N-methylol-phthalimide and 2 g. (0.0124 mol) of hexamethyldisilazane and 0.1 g. of $NH_4Cl$ are boiled under reflux at 120–130° C. When the reaction is complete, petroleum ether is added, the reaction mixture is filtered, the filtrate is cooled with ice, and the precipitated product is separated by suction filtration and dried.

Yield: 3.5 g. (0.01408 mol)=62% by weight of theoretical.

Melting point: 62–63° C.

$C_{12}H_{15}O_3NSi$ (249.35).—Calculated (percent): C, 57.71; H, 6.06; N, 5.62; Si, 11.26. Found (percent): C, 57.79; H, 5.95; N, 5.70; Si, 10.91.

EXAMPLE 7

20 g. (0.198 mol) of N-methylolacrylamide, 18 g. (0.112 mol) of hexamethyldisilazane, 25 ml. of methyl acetate, 0.1 g. of $(NH_4)_2SO_4$ and 0.01 g. of phenothiazine are reacted together at 30 to 40° C. in a manner analogous to Example 1. The solvent is evaporated off and the residue is distilled using an oil pump.

Yield: 29.5 g. (0.17 mol)=85% by weight of theoretical.

B.P.$_{0.2\,mm}$ 78–79° C. $d_4^{20}=0.9800$. $n_D^{20}=1.4582$.

$C_7H_{15}O_2NSi$ (173.295).—Calculated (percent): C, 48.52; H, 8.72; N, 8.08; Si, 16.21. Found (percent): C, 48.53; H, 8.53; N, 8.34; Si, 16.02.

EXAMPLE 8

In a manner analogous to Example 7, 300 g. (2.6 mol) of N-methylol-methacrylic acid amide, 240 g. (1.5 mol) of hexamethyldisilazane, and 0.1 g. of $(NH_4)_2SO_4$ are reacted at 40° C. in the presence of 250 ml. of ethyl acetate and 0.01 g. of phenothiazine and worked up.

Yield: 469 g. (2.5 mol)=96% by weight of theoretical.

B.P.$_{0.2\,mm}$: 77–79° C. Melting point: 31–32° C.

$C_8H_{17}O_2NSi$ (187.20).—Calculated (percent): C, 51.26; H, 9.16; N, 7.48; Si, 14.95. Found (percent): C, 50.66; H, 9.29; N, 7.46; Si, 14.73.

If 50 g. (0.045 mol) of N-methylol-methacrylic acid amide and 45 g. (0.26 mol) of N-methyl-hexamethyl-disilazane are reacted under the conditions of Example 8 there are obtained 61 g. (0.33 mol)=73% by weight of methacrylic acid amide-N-methylol-trimethylsilyl ether.

Melting point 31–32° C.

EXAMPLE 9

In a manner analogous to Example 1, 3 g. (0.015 mol) of N-methylol-p-toluenesulphonic acid amide and 1.75 g. (0.008 mol) of hexamethyldisilazane are reacted together at 75 to 80° C. in the presence of 0.01 g. of sulphuric acid (conc.). When the reaction is complete, petroleum ether is added and the reaction mixture is filtered.

The filtrate is cooled and the precipitated product is separated by suction filtration and recrystallised.

Yield: 3 g. (0.011 mol)=73.5% by weight of theoretical.

Melting point: 70.5–71.5° C.

$C_{11}H_{19}O_3NSi$ (273.417).—Calculated (percent): C, 48.32; H, 7.00; N, 5.12; Si, 10.27. Found (percent): C, 48.48; H, 6.45; N, 5.30; Si, 10.21.

EXAMPLE 10

In a manner analogous to Example 1, 23 g. (0.17 mol) of N-methylol-carbamic acid allyl ester in 15 g. of ethyl acetate are reacted with 15 g. (0.09 mol) of hexamethyl disilazane at 80–85° C. within 20 minutes and worked up.

Yield: 25 g. (0.12 mol)=71% by weight of theoretical.

B.P.$_{0.2\,mm}$: 58–61° C. $n_D^{20}:1.4452$. $d_4^{20}:1.0206$.

$C_8H_{17}NO_3Si$ (203.322).—Calculated (percent): C, 47.26; H, 8.43; Si, 13.82. Found (percent): C, 47.46; H, 8.39; Si, 13.46.

EXAMPLE 11

21.5 g. (approximately 0.1 mol) of a methylolmelamine compound prepared from formaldehyde and melamine and containing about three methylol groups were dissolved in 50 ml. of dimethylsulphoxide and reacted with 30 g. (0.19 mol) of hexamethyldisilazane at 60-70° C. within 15 minutes. The solvent was drawn off and the residue was dissolved in ethyl acetate and precipitated from petroleum ether.

Yield: 34 g. (0.079 mol)=79% by weight of the theoretical.

The product had a Si content of 18.4%, which corresponds to a degree of substitution of the methylol groups of 95%.

EXAMPLE 12

In a manner analogous to Example 1, 15 g. (0.1 mol) of nicotinic acid amide are reacted with 12 g. (0.06 mol) of hexamethyldisilazane at about 80° C. within 10 minutes. The product was recrystallised from petroleum ether.

Yield: 17 g. (0.07 mol)=76% by weight of the theoretical.

Melting point: 74–74.5° C.

$C_{10}H_{16}N_2O_2Si$ (224.344).—Calculated (percent): C, 53.54; N, 12.49; Si, 12.52. Found (percent): C, 54.10; N, 12.40; Si, 12.60.

EXAMPLE 13

In a manner analogous to Example 1, 10 g. (0.064 mol) of N-methylolhexahydrobenzoic acid amide are reacted with 9 g. (0.05 mol) of hexamethyldisilazane at 60° C.

Yield: 10.5 g. (0.044 mol)=69% by weight of theoretical.

Melting point: 71–72° C.

$C_{11}H_{24}NO_2Si$ (228.411).—Calculated (percent): C, 57.99; H, 10.57; N, 6.13. Found (percent): C, 57.25; H, 9.84; N, 6.38.

EXAMPLE 14

In a manner analogous to Example 1, 13 g. (0.1 mol) of N-methylol-p-chlorobenzoic acid amide are reacted with 12 g. (0.75 mol) of hexamethyldisilazane at 110° C.

Yield: 11 g. (0.043 mol)=43% by weight of theoretical.

Melting point: 90–91° C.

$C_{11}H_{16}ClNO_2Si$ (257.804).—Calculated (percent): C, 51.34; H, 6.27; N, 5.44. Found (percent): C, 51.52; H, 6.24; N, 5.42.

EXAMPLE 15

In a manner analogous to Example 1, 16.5 g. (0.1 mol) of N-methylolphenylacetic acid amide are reacted with 12 g. (0.075 mol) of hexamethyldisilazane at 60–70° C.

Yield: 12 g. (0.51 mol)=51% by weight of theoretical.

Melting point: 41–42° C.

$C_{12}H_{19}NO_2Si$ (237.364).—Calculated (percent): C, 60.73; H, 8.11; N, 5.90. Found (percent): C, 60.69; H, 7.75; N, 6.10.

EXAMPLE 16

10 parts by weight of N-trimethyl siloxymethyl methacrylamide, 30 parts by weight of methyl methacrylate are mixed with 45 parts by weight of xylene. After addition of 0.4 part by weight of azodiisobutyrodinitrile and 0.3 part by weight of ditert.-dodecylmercaptan as regulator polymerization was carried out at 70° C. during 6.5 hours. The copolymer obtained has a relative viscosity of 1.1953 measured with an Oswald viscosimeter at 25° C. and at a concentration of 10 g./litre in benzene.

Demonstration of conversion of the soluble copolymer into insoluble cross-linked product: 0.22 ml. of $$4n-H_2SO_4$$

solution is added to 20 g. of a 25% by weight solution in xylene/butanol (11:1) of the copolymer obtained. The mixture becomes cloudy after only 10 minutes, a gel-like product being formed, accompanied by cross-linking.

A film of the copolymer which is stoved for 30 minutes at 150° C. is insoluble in xylene and has a gel-content of almost 100%.

We claim:

1. A compound selected from the group consisting of:

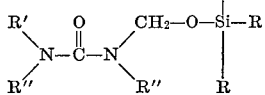

and

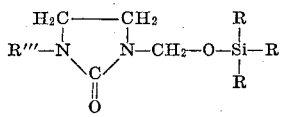

wherein R is alkyl, R' is hydrogen or

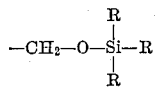

wherein R is also alkyl, each R'' is hydrogen, alkyl of 1 to 4 carbon atoms, alkenyl of 2 to 6 carbon atoms or butadiene-(1,3)-yl and R''' is hydrogen, alkyl of 1 to 4 carbon atoms, alkenyl of 2 to 6 carbon atoms, butadiene-(1,3)-yl or

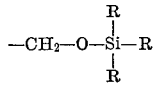

wherein R is also alkyl.

2. The compound of claim 1 wherein each R is methyl.
3. The compound of the first formula of claim 1 wherein each R'' is hydrogen.
4. The compound of claim 3 wherein each R is methyl.
5. The compound of the first formula of claim 1 wherein R' is

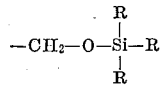

and each R'' is hydrogen.

6. The compound of claim 5 wherein each R is methyl.
7. The compound of the second formula of claim 1 wherein R''' is hydrogen.
8. The compound of claim 7 wherein each R is methyl.
9. The compound of the second formula of claim 1 wherein R''' is

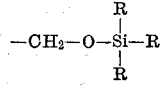

10. The compound of claim 9 wherein each R is methyl.

References Cited

UNITED STATES PATENTS

| | | | |
|---|---|---|---|
| 3,049,559 | 8/1962 | Montgomery | 260—448.2 |
| 3,172,874 | 3/1965 | Klebe | 260—448.2X |
| 3,208,971 | 9/1965 | Gilkey et al. | 260—448.2X |
| 3,243,429 | 3/1966 | Ham | 260—448.2X |
| 3,278,484 | 10/1966 | Tesoro | 260—448.2X |
| 3,346,609 | 10/1967 | Klebe | 260—448.2 |
| 3,440,261 | 4/1969 | Saam | 260—448.2 |

TOBIAS E. LEVOW, Primary Examiner

W. F. W. BELLAMY, Assistant Examiner

U.S. Cl. X.R.

260—448.8, 46.5